United States Patent [19]

Blish

[11] Patent Number: 5,201,287
[45] Date of Patent: Apr. 13, 1993

[54] VARIABLE STROKE INTERNAL COMBUSTION ENGINE

[76] Inventor: Nelson A. Blish, 302 Cove Creek, Houston, Tex. 77042

[21] Appl. No.: 923,607

[22] Filed: Aug. 3, 1992

[51] Int. Cl.⁵ .......................................... F02B 75/04
[52] U.S. Cl. ................................................ 123/48 B
[58] Field of Search ............... 123/197.1, 197.4, 48 B, 123/78 F

[56] References Cited

U.S. PATENT DOCUMENTS

| | | | |
|---|---|---|---|
| 1,111,252 | 9/1914 | Eagle | 123/78 F |
| 1,572,918 | 2/1926 | Geddes | 123/78 F |
| 2,433,639 | 12/1947 | Woodruff et al. | 123/48 B |
| 2,589,958 | 3/1952 | Petit | 123/48 B |
| 2,897,804 | 8/1959 | Crooks | 123/48 B |
| 4,240,386 | 12/1980 | Crist | 123/48 B |
| 4,738,230 | 4/1988 | Johnson | 123/48 B |
| 4,860,702 | 8/1989 | Doundoulakis | 123/78 F |
| 5,136,987 | 8/1992 | Schechter et al. | 123/48 B |

FOREIGN PATENT DOCUMENTS

| | | | |
|---|---|---|---|
| 3127760 | 3/1983 | Fed. Rep. of Germany | 123/48 B |
| 417309 | 11/1910 | France | 123/78 F |

*Primary Examiner*—David A. Okonsky
*Attorney, Agent, or Firm*—Nelson A. Blish

[57] ABSTRACT

A variable stroke piston system (10). The effective length of the stroke of an internal combustion engine is increased by extending end lobe (14) from main lobe (16) by means of extension rod 18. Extension rod (18) may be operated hydraulically, mechanically or electrically.

5 Claims, 2 Drawing Sheets

VARIABLE STROKE INTERNAL COMBUSTION ENGINE

BACKGROUND OF THE INVENTION

This invention relates to internal combustion engines, in general, and in particular, to a system for increasing the effective stroke length of the piston rod.

It is known that the length of the stroke of the piston in the cylinder relates to the efficiency of the engine. However, the optimum length of the stroke of the piston at peak power is different from the optimum length of the stroke of the piston at mid-range power and at low power. Therefore, the length of the stroke of the piston in prior art engines is a compromise, in order to maximize power in one range. This results in the length of the stroke being less than optimum, or greater than optimum, at other power settings.

SUMMARY OF THE INVENTION

In the present invention, the length of the stroke of the piston is varied over the engine operating range in order to maximum power at all engine operating conditions. In one embodiment, this is done by increasing the length of the lobe that attaches the piston rod to the crankshaft.

DETAILED DESCRIPTION OF THE INVENTION

Figure 1:
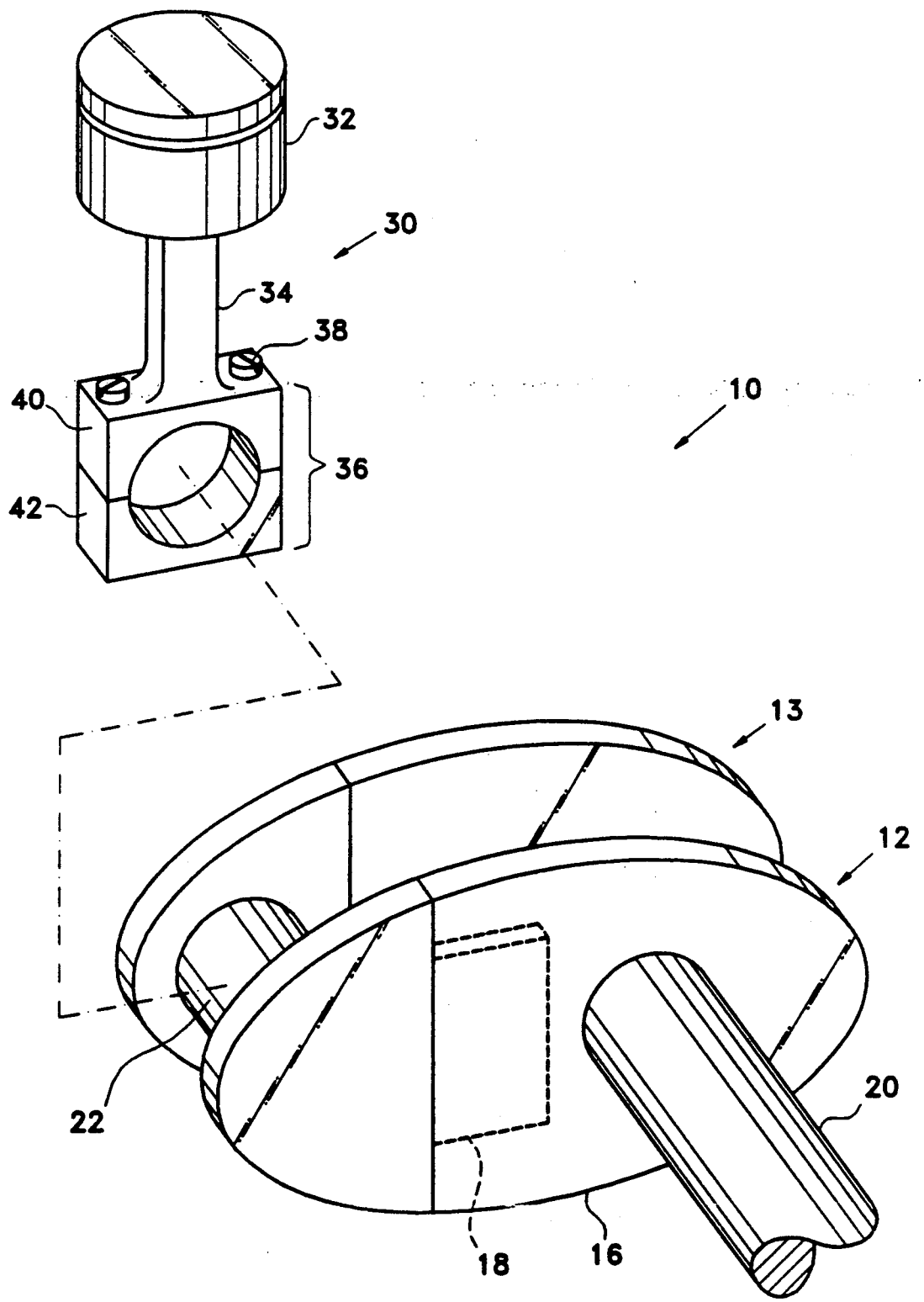
FIG. 1 shows a perspective view, partially disassembled, of the variable length piston rod operating system.

Referring now to the drawings and in particular, FIG. 1, there is shown a variable length piston rod operating system designated in general by numeral 10. The major components of piston rod operating system 10 are a piston assembly 30, crankshaft lobes or crankwebs 12 and 13, and crankshaft 20.

Piston rod 34 is pivotally attached at one end to piston 32 as is well known in the art. At its other end, piston rod 34 is attached to the crankshaft by segmented piece 36. Segmented piece 36 is comprised of two pieces, upper segment 40, and lower segment 42. Upper segment 40 is rigidly attached to rod 34. Lower segment 42 is attached to upper segment 40 by bolts 38.

Segmented piece 36 attaches piston rod 34 to piston crank 22. The crank 22 is offset from the center line of the crankshaft 20 so that as piston 32 and piston rod 34 are forced downward, the forces exerted on the crankshaft cause it to turn or rotate. The amount of offset of piston crank 22 from the center line of the crankshaft 20, determines the length stroke of the piston. The stroke means the distance that the piston moves up and down in the cylinder, not shown, during each cycle of the engine.

Piston crank 22 is attached to crank shaft 20 by first lobe 12 and second lobe 13. First and second lobe are essentially identical. Each lobe 12 and 13 is comprised of a main lobe 16 and end lobe 14. End lobe portion 14 is attached to main lobe portion 16 by lobe extension rod 18.

Extension rod 18 is rigidly connected to end lobe 14 and slidably connected to main lobe 16. In other embodiments, these connections could be reversed. Extension rod 18 is hydraulically actuated in the preferred embodiment in a manner similar to hydraulically actuated valve lifters, as is well known in the art. This may be accomplished by supplying hydraulic fluid through a line concentric to the crankshaft 20.

Figure 2:
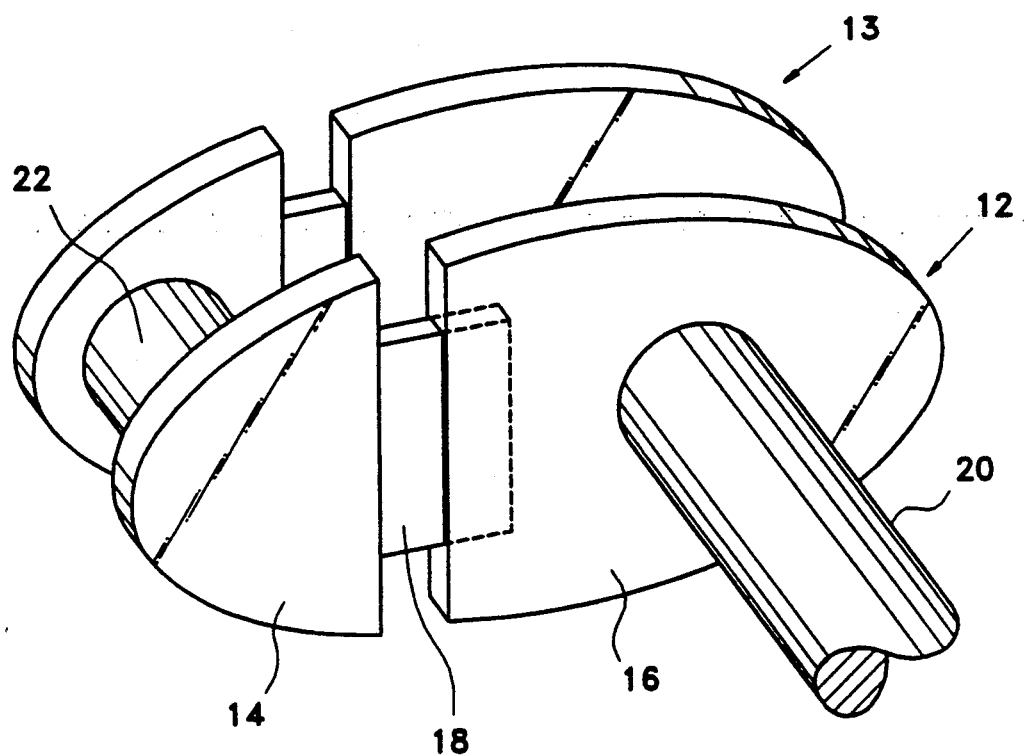
FIG. 2 shows a perspective view of the crankshaft lobes with the lobes extended.

FIG. 2 shows that end lobe 14 has been extended outward from the center line of the crankshaft 20. This increases the distance from the center line of the crankshaft 20 by which the piston rod 34 is attached. Thus the piston 32 is pulled further out of the cylinder on each stroke and enters the cylinder further on each stroke. Also, when the piston crank 22 is at approximately 90° to the center line of piston travel, it is seen that greater foot-pounds of torque will be applied to the crankshaft, since torque is the product of force times distance.

The amount of offset, the distance from the center line of crankshaft 20 to the point at which rod 34 is connected to lobes 12 and 13, is varied by the amount that end lobe 14 is extended. This offset may be adjusted to an infinite number of positions. Alternatively, the offset may be adjusted to one of two stable positions in order to lock it into place.

The means of extending the cam may be hydraulic as in the preferred embodiment, or electrical or mechanical. The hydraulic or electrical or mechanical actuators, not shown, would be located concentric to crankshaft 20. An on-board computer, such as the one used to adjust spark advance in the ignition system, would be used to determine the conditions and operating speed at which to extend end lobe 14.

Mechanical, electrical, and hydraulic connections to extend end lobe 14 may be intricate and complex. In some engine models, it may be desirable to use variable stroke technology on only some of the cylinders in a multicylinder engine. For example, in a four cylinder engine, it may be desirable to have the cylinder on each end of the block, cylinders 1 and 4, use the variable stroke technology. In this embodiment, while only 2 of the 4 cylinders are able to operate at maximum efficiency at all speeds and power ranges, the overall efficiency of the engine would still be increased. Also, the connections to actuate the lobe extension rods would be simpler since connections to the middle cylinders are not necessary.

I claim:

1. A system for effectively increasing the length of a piston stroke of an internal combustion engine comprising:
   a piston;
   a piston rod attached to said piston at a first end;
   a crankpin attached to a second end of said piston rod;
   a crankshaft attached to said crankpin via crankwebs for converting reciprocating motion of said piston into rotary motion and, wherein said crankwebs may be extended during engine operation to effectively increase the length of the stroke of said engine.

2. A system as in claim 1 wherein said crankwebs are extended by hydraulic means.

3. A system as in claim 1 wherein said crankwebs are extended by mechanical means.

4. A system as in claim 1 wherein said crankwebs are extended by electrical means.

5. A system as in claim 1 wherein said crankwebs are segmented and one end portion of each of said respective crankwebs is extended from a main portion.

* * * * *